Patented Nov. 19, 1929

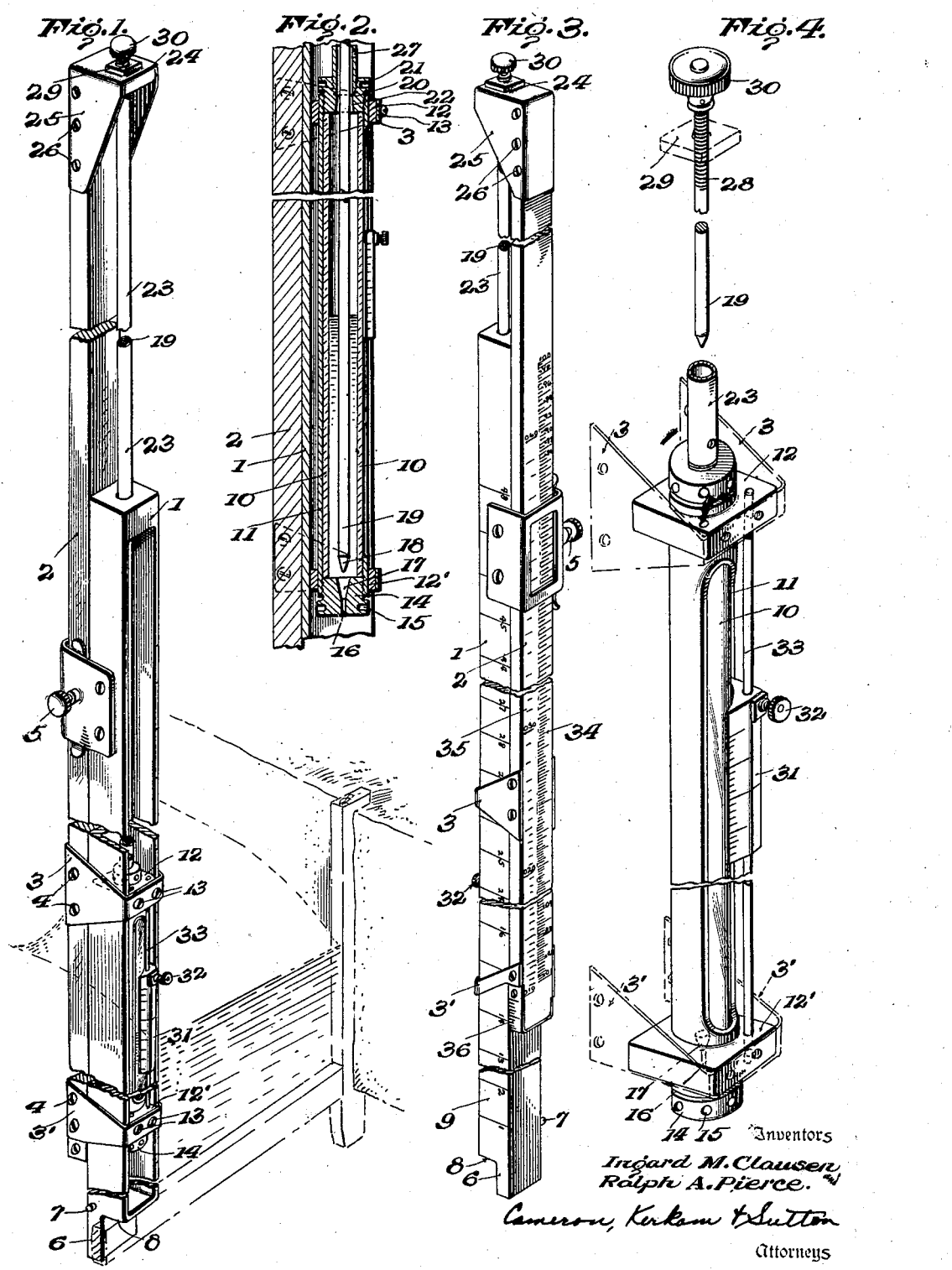

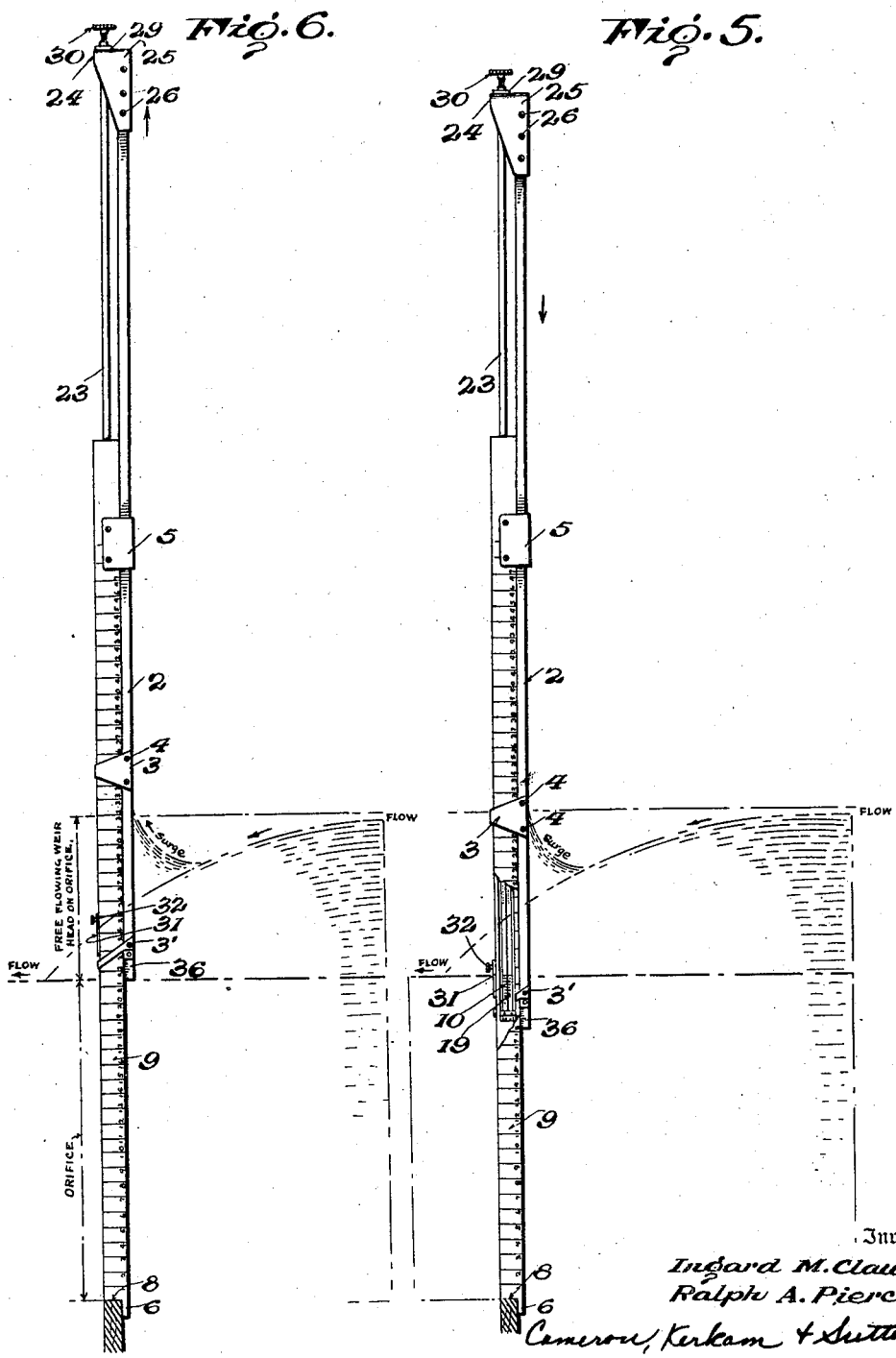

1,735,953

UNITED STATES PATENT OFFICE

INGARD M. CLAUSEN AND RALPH A. PIERCE, OF PHOENIX, ARIZONA

METHOD OF MEASURING WEIR DISCHARGE AND RULES THEREFOR

Application filed January 18, 1928. Serial No. 247,700.

This invention relates to the art of obtaining accurately measured quantities of water flowing over weirs, and is a continuation in part of our application Serial No. 122,994, filed July 16, 1926.

Our prior application above referred to discloses a method and means for accurately measuring, at the weir itself, the quantity of water flowing thereover, whether of the free-flowing or of the submerged or suppressed type. Generally speaking, the factors which affect and determine the amount of water which flows over a weir are: (1) the upstream head of water above the crest of the weir, (2) the velocity of approach of the water to the weir, (3) the length of the weir, and (4) in the case of a submerged or suppressed weir, the downstream head of water above the crest of the weir.

From these factors, the amount of water flowing over a weir may be determined by standard weir formulæ well known to the art. In the case of a free-flowing weir, for example, the well known weir formula, neglecting the velocity of approach, is $$Q = 2/3 \, CL\sqrt{2G}H^{\frac{3}{2}} \quad (1)$$

in which:

Q is the quantity of water discharged over the weir;
C is an empirical coefficient;
L is the length of the weir;
G is the acceleration due to gravity;
H is the upstream head above the crest of the weir.

In the case of a submerged weir, the determination of the amount of water flowing thereover involves two operations. First, according to the standard practice, all that portion of the water which flows between the crest of the weir and the downstream head above the crest of the weir is treated as water flowing through an orifice, the dimensions of which are the length of the weir and the downstream head above the crest of the weir, said orifice being under a head equal to the difference between the said downstream head and the upstream head. Then according to the well known formula for a submerged orifice $$Q = CA\sqrt{2GH} \quad (2)$$

in which A is the area of the theoretical orifice.

Second, the remaining portion of the water flowing above the theoretical orifice may be treated as water flowing over a free-flowing weir, having a theoretical crest which is the top of the theoretical orifice, or in other words the height of the said downstream head. This portion of the water may therefore be computed according to Formula (1) neglecting the velocity of approach. The quantity of water flowing over the submerged weir then becomes $$Q = CA\sqrt{2GH} + 2/3\, CL\sqrt{2G}H^{\frac{3}{2}} \quad (3)$$

Our aforesaid application includes the following discoveries:

First, that if a vertical obstruction is placed on the crest of the weir in the channel, the water will surge up the upstream face of the obstruction to a height above the crest of the weir or above the theoretical orifice, which height, if used in the formula as the upstream head, will give the true and accurate quantity of water flowing over the weir, corrected for the velocity of approach to the weir; and Second, that on the downstream face of the obstruction, in the case of a submerged weir, there will be a small quiescent surface adjacent thereto and somewhat below the immediately surrounding stream which is the true downstream head above the crest of the weir.

From the foregoing, it will be apparent that all of the variable factors, except the length of the weir, which are involved in calculating the amount of water flowing over a free-flowing weir, as in Formula (1), or over a submerged weir, as in Formula (3), may be measured directly at the weir by the use of the obstruction referred to. Furthermore, said obstruction may take the form of a suitable scale member, calibrated in accordance with the above formulæ, from which may be read directly in suitable units the quantity of water flowing over the weir per unit length corresponding to the surge height on the scale, as more fully described in our prior application and likewise hereinafter.

The present application is a continuation of said prior application as respects the methods thereof, and therefore one of the objects of the invention is to provide a method of obtaining accurately measured quantities of water by measurements taken directly at a weir, either of the free-flowing or submerged type, to afford data whereby an accurate calculation of the amount of water flowing thereover may be made, thus eliminating corrections for velocity of approach, changing channel conditions, etc.

Another object of the present invention is generally to provide a novel and improved weir measuring device whereby measurements taken directly at the weir will provide data whereby an accurate calculation of the amount of water flowing over a weir of any given dimensions may be made.

Another object is to provide a novel and improved weir measuring device whereby the amount of water passing over the weir, whether of the free-flowing or submerged type, may be determined without complicated measurements or calculations and with extreme accuracy.

A further object is to provide a weir measuring device with novel and improved means whereby the measurements taken thereby may be more accurately and readily made.

Other objects of the invention will appear as the description of the invention proceeds.

An explanation of certain theoretical considerations will aid in a better understanding of the present invention. It will be apparent from well known laws of hydraulics, that if a static head of water causes a flow of water through a defined channel, the said static head will be gradually converted into a velocity head, and at any intermediate point, the total head will comprise two components, namely, a static head and a velocity head. Neglecting friction, absorption losses, and the like, the sum of the said two components will at any point equal the original static head. Thus water in a channel approaching a weir exerts a static pressure head and a velocity head due to the velocity of approach. We have determined from numerous experiments that the height to which the water will surge on the face of an obstruction placed in the channel at the weir, will be substantially equal to the original static head, unconverted into velocity head, as would be the case if the entire channel was dammed. Thus in the case of a free-flowing weir, the measurement of the surge height gives the true head on the wier, corrected for the velocity of approach.

If the weir is of the submerged type, it will be apparent that the entire static head is not converted into a velocity head during the flow over the weir, but that at the weir there will be two components, one a static pressure head and the other a velocity pressure head. The difference between the original static head, given by the surge height, and the true static head at the weir, will represent the velocity head over the weir. From a consideration of the theory of the submerged weir Formula (3), given above, it will be perceived that this static head at the weir is also the orifice height above the crest of the weir to be employed in the formula. In other words, applying the orifice analogy, the upstream static head is decreased at the weir by a certain amount which has been converted into a velocity head through the theoretical orifice; on the other side of the orifice, the remaining static head on the weir or bottom of the orifice will be that of the water in the orifice. Therefore, the static head at the weir should be and is the true top of the theoretical orifice to be used in the formula, analogously to the case of a true orifice under a static head.

The principle above described is analogous to the determination, by the well known piezometer method, of the hydraulic gradient in the case of water flowing through a pipe under a static head. That is, given the original static head causing a flow, and a point on the hydraulic gradient showing the fall in static head due to conversion into velocity head, it is possible to compute the velocity of the flow. The original static head is given by the surge height, and the point on the hydraulic gradient by measuring the static head at the weir. But whether or not our above theory be correct, we have by numerous experiments under widely varying conditions, determined that the results obtained by the adaptation and use of this theory as hereinafter described in measuring water flow over a weir are extremely accurate and that the errors involved, if any, are negligible.

Our invention, therefore, broadly or generally stated, comprises the method of and apparatus for measuring the surge height at the weir to determine the upstream static head, and measuring the static head at the weir, analogously to the principle of the piezometer, whereby the amount of water flowing thereover may be calculated. For the purpose of taking the piezometer measurements, any suitable means may be employed whereby a hydrostatic column is subjected to the static pressure at the weir. The height of such hydrostatic column, according to well known principles, will give the true static head at the weir which is then used as the downstream head above the crest of the weir as involved in the formula.

One embodiment of the invention has been illustrated in the accompanying drawings, but as it will be apparent that the invention is susceptible of a variety of mechanical expressions, it is to be expressly understood that the drawings are for purposes of illustration only and are not to be construed as a definition of the limits of the invention, reference being had to the appended claims for this purpose.

In the drawings,

Fig 1 is a perspective view of the measuring device positioned on the crest of a weir;

Fig. 2 is a sectional view of the piezometer attachment;

Fig. 3 is a perspective view of the upsteam face of the measuring instrument;

Fig 4 is a perspective of the piezometer attachment; and

Figs. 5 and 6 illustrate the practical use of the instrument.

Our invention preferably comprises, as in our prior application, a compound rule consisting of two relatively displaceable members, adapted to be placed on the crest of a weir. One of said members is provided with a suitable linear scale in any desired units, whereby the height of water in a piezometer tube above the crest of the weir may be measured as more fully described hereinafter. The other member, which is relatively displaceable to said first member, is preferably provided with a plurality of scales calibrated as hereinafter described, the height to which the water surges on said scales indicating the amount of water flowing through the orifice, the free-flowing wier, etc.

It will be apparent that any suitable units may be employed for calibration, such as second feet, miner's inches, etc., or suitable units of different numerical systems such as the metric system. If desired, the same instrument may be calibrated to read in a plurality of such units, but for purposes of illustration the embodiment described is adapted to read in second feet.

Refering now to the drawings, wherein like reference numerals indicate like parts throughout the several views, the said relatively displaceable members comprise a bar 1, preferably channel-shaped for a purpose to be described, and a second bar 2, said bars having cooperating sliding faces and slidably engaging one another in any suitable manner, as by means of suitable brackets 3, 3', secured to one of said members by means of screws 4, and slidably engaging the other of said members. Any suitable means, such as a clamp 5, may be provided for securing the said members in a desired adjusted position. The bar members 1 and 2 may be made of any suitable material. For example, the use of cast aluminum for the channeled bar 1 and of wood for the bar 2, has been found very satisfactory.

The bar 1 is adapted to be placed on the crest of a weir, and may be readily maintained in that position by means of a downwardly projecting lug or stop member 6 at its lower extremity. A suitable stop member 7 is preferably provided adjacent the lower extremity of the member 1 to limit the sliding movement of the member 2 relative thereto. The shoulder 8, which rests on the crest of the weir, is the zero point of a suitable scale 9 on one face of the member 1, and graduated in any suitable or desired linear units such as the inch. The purpose of this scale is to read the height of the hydrostatic water column, as described hereinafter.

While any suitable means may be employed for making the piezometer measurements, said means preferably comprises a tube of transparent material such as glass or the like, slidably mounted on the measuring instrument, and open at both ends. Preferably, said tube is slidable in the channel formed in the bar 1, on its downstream face as shown in Fig. 1, thus being effectively protected from the velocity of the stream flowing over the weir and indicating the true static pressure level. Any suitable means may be provided for slidably mounting the said tube in the channel, but preferably it is secured to the member 2, whereby when the latter is raised or lowered relative to the member 1, the tube is likewise raised or lowered in the channel. Referring now particularly to Figs. 2 and 4, a glass tube 10, open at both ends, is mounted in a surrounding protecting tube or sheath 11 preferably of metal, which is cut away on one side to expose the glass tube as shown in Fig. 4. The protecting tube 11 at either end passes through and is suitably secured, as by soldering, to the supporting members 12, 12', which members are preferably squared to fit the channel in the bar member 1 to guide the tube in its sliding movement. In the form shown, said supporting members 12 and 12' are secured in any suitable way as by means of screws 13 to the brackets 3, 3', whereby when the bar 2 is displaced relative to the bar 1, the tube 10 is correspondingly displaced in the channel.

Preferably the ends of the protecting tube 11 extend beyond the glass tube 10, and are interiorly threaded to receive suitable adjusting nuts which hold the glass tube in position. Furthermore, in the preferred embodiment of the invention, said tube is provided with a suitable valve whereby the water column may be impounded therein and the rule removed from the weir to read the height of said column. In the form shown, the lower end of the tube 11 receives a capstan adjusting nut 14, provided with capstan holes 15, and having a central opening 16 therethrough. The opening 16 is adapted to be closed by a suitable valve, and to this end may be conical at 17 to provide a seat for a conical valve 18 carried by a valve rod 19. The other end of the protecting tube 11 receives a capstan adjusting nut 20, provided with capstan holes 21, and having a central opening 22 therethrough.

The valve rod 19 extends upwardly through the tube 10 and through the opening 22 in the nut 20 to a suitable point where means are provided for opening and closing the valve 18. In the form shown, said means are located at the top of the bar 2 and the valve rod 19 extends thereto through a tube 23, threaded at one end into the capstan adjusting nut 20 and at the other end in a supporting shelf or projection 24 suitably secured to the bar member 2 as by means of brackets 25 and screws 26. The tube 23 is provided with a small opening 27 adjacent the top of the tube 10 in order that the latter may be open to the atmosphere at its upper end. The valve rod 19 is threaded at 28 adjacent its upper end, where it passes through a suitable nut 29, preferably secured to the shelf 24 as by means of soldering. The tip of the valve rod 19 may be provided with a suitable thumb nut 30.

For the purpose of reading the height of water in the tube 10, on the scale 9, any suitable means may be employed. Preferably, a sliding scale 31, graduated in tenths of inches and provided with a set screw, having a finger piece 32, is carried slidably on a rod 33 suitably supported at either end in the supporting members 12 and 12'. The sliding scale may be set on the rod 33 so that its graduations correspond with those of scale 9, whereupon the height of the water column may be read in inches from scale 9 and in tenths of inches from scale 31. Obviously, any variations of the above means for reading the height of the water in the tube could be employed.

When the height of the water in the tube 10 has been read by means of the scale 31 and the inch scale 9, the bar 2 is displaced relative to the member 1 until its bottom edge is exactly at the point on the scale 9 at which the water in the tube 10 was read. This point indicating as above described the top of a theoretical submerged orifice, the surge on the bar 2 above the bottom of said bar, when again placed on the weir, will be the static head on the top of the orifice and on the free-flowing weir. If suitably calibrated logarithmic scales be placed on the member 2, the surge height so read will indicate directly in suitable units the quantity of water which is discharged over the weir. Referring now to Formula (1), for the free-flowing weir, and solving the same for H, we have $$H = \left(\frac{3Q}{2CL\sqrt{2G}}\right)^{\frac{3}{2}} \quad (4)$$

We have determined by a series of experiments that in this formula, the value of the empirical coefficient C (when the formula is calibrated on a rule which is adapted to be placed in the channel above a weir crest, thereby obstructing somewhat the flow of water) is a variable which varies as the width of the rule is to the width of the weir. While a rule of any suitable width may be employed, we prefer to adopt a width of approximately one and three-eighths inches, for which width the value of C as determined experimentally is .607.

Now, assuming this value of C, and assuming L to be one, successively increasing values of Q may be substituted in the above Formula (4), and a series of corresponding values of H obtained. If these values of H are marked successively on the face of the bar 2, beginning at the bottom thereof and extending upward, and the corresponding value of Q is placed opposite each mark, there will be provided a logarithmic scale indicating the second feet of water passing over the weir, per unit of weir length, for each value of H. Such a scale is indicated in Fig. 3 at 34.

Referring now to Formula (2) above, and solving for H, we have $$H = \left(\frac{Q}{CA\sqrt{2G}}\right)^2 \quad (5)$$

We have determined from experiments that the empirical coefficient C (which when calibrated on the above rule is likewise a variable depending on the relation of the width of the rule to the width of the weir), for the width of the rule above stated and for weirs of widths ordinarily employed, has a value of .60. Assuming this value of C, and assuming A to be 1, successive values of Q may be substituted in the above Formula (5) and a series of corresponding values of H obtained, which may be laid off successively on the bar 2 as described above in connection with the scale 34, and which will constitute a logarithmic scale 35. The said scale 35 therefore indicates, for any surge height, the quantity of water discharged per square inch or other unit of orifice opening.

In the practical use of our improved measuring rule, in order to obtain measured quantities of water to be delivered to the users, it is generally necessary for the operator to make one or more runs per day, since the requirements of individual users vary as to amount and number and time of runs. Hence, the operator first opens the lateral thereby causing the water to flow over the weir, and employs the measuring rule as follows:

*Free-flowing weir.*—For use on a free-flowing weir, the two bars 1 and 2 are adjusted with their zero scale points exactly coinciding, which position is determined by engagement of the brackets 3' with the stop member 7. The foot of the rule is then placed on the weir, with the scale 34 on the face of the rule turned upstream, and the height of the surge on the said scale noted. This may conveniently be done by throwing a small quantity of dust or similar material on the face of the rule and then reading the wash left by the water. Let it be assumed that this reading on the scale is .895. The discharge over the weir is then .895 units per unit of weir length, or in the case assumed .895 second feet per inch of weir length. The length of the weir is now measured by means of the scale 9, and is found to be, for example, 60 inches. The total discharge over the weir is then 60 times .895 or 53.7 second feet.

*Submerged weir.*—In the case of a submerged weir, in taking the piezometer measurements, it is preferable to first fill the tube 10 completely with water and then to allow the same to run out until the desired level is reached. It has been found that if the tube is placed in the channel empty, and the water allowed to enter through the opening 16, the restricted size of the opening will to a slight degree restrict the flow of water therethrough and the height reached in the hydrostatic column will not be accurate. Filling the tube in this manner before placing the rule on the weir likewise serves to indicate if the valve 18 is clogged or stopped up in any manner. Therefore the valve 18 is first opened by means of the thumb nut 30, and the rule is held under water until the tube is completely filled. The valve 18 is now closed, and the rule is positioned vertically on the weir, in the position shown in Fig. 5.

The tube is now adjusted until the opening 16 has a suitable submergence, by adjusting the member 2 relative to the member 1. The extent of submergence of the opening should ordinarily be approximately two or three inches below the apparent still water level on the rule of the water flowing past the rule, where said opening is sufficiently above the weir crest that any upward velocity component of the water immediately above the crest of the weir will not affect the readings. This position of the tube is shown in Fig. 5. The valve 18 is now opened, and the water in the tube is allowed to seek its own level which it will do in a very short time. The level will be found somewhat lower than the surrounding stream and approximately even with the downstream flow, as clearly shown in Fig. 5. The valve 18 is now closed, and the rule removed from the weir for the purpose of adjusting the sliding scale 31 and reading the height of the water column on the scale 9.

Having taken this reading, the member 2 is shifted until the zero points of its scales are opposite the said reading of the scale 31 on scale 9, and clamped in position by the clamp 5. For convenience in making this adjustment, the foot of the member 2 may be provided with a second scale 36 corresponding to the sliding scale 31 and likewise graduated in tenths of inches, so that the position of said foot may be adjusted accurately in tenths of inches corresponding to the reading of the height of water in the tube in tenths of inches. The rule is now ready to be placed again in position on the weir, as shown in Fig. 6. The height of the surge is then read on the orifice scale and on the free-flowing weir scale. The actual surge height will be somewhat higher than the level of the stream approaching the weir, depending on the velocity of approach.

Let it be assumed, for example, that the scale 9 is graduated in inches and the scales 34 and 35 in second feet. Let it also be assumed that the height of the hydrostatic column determined as above described was 21.7 inches above the crest of the weir. The bottom of the member 2 is therefore placed at an elevation of 21.7 inches above the crest of the weir. Let it be assumed that the surge reading, read as above described in connection with the free-flowing weir, is .031 on the orifice scale, and .216 on the free-flowing weir scale. In other words, the discharge per square inch of orifice opening is .031 second feet, and the discharge per lineal inch of weir length of free-flowing weir is .216 second feet. Let it be further assumed that the width of the weir, as measured with the scale 9, is 60½ inches. It will now be apparent that if the orifice scale reading, .031, be multiplied by the height of the orifice, or 21.7, a product (.6727) will be obtained which is the discharge in second feet per inch of length of orifice opening. If this figure is added to the free-flowing weir scale reading, there will be obtained the total weir discharge in second feet per lineal inch of weir length, or .8887. To determine the weir discharge, it is now only necessary to multiply this factor by the width of the weir or 60½ inches, and the discharge is found to be 53.7 second feet.

Extensive experiments carried out with the above rule in actual practice, and under widely varying conditions, have given results of remarkable consistency and excellence. Tests have been made under a variety of practical conditions, as on weirs constructed by placing boards across irrigation channels, where the size of the channel, velocity of flow therethrough, height of the weir, depth of submersion, etc., have varied widely, with uniformly good results. Furthermore, tests made on a series of closely adjacent submerged weirs placed in the same channel and of successively decreasing height in an upstream direction have shown that the height of the surge on the stick, placed on the successive weirs, and measured from the substantially level bottom of the stream, was substantially the same for each weir, showing that the true static head measured at each weir, and unconverted into velocity heads, was substantially the same, as is obviously theoretically correct. These tests have also shown that when the height of the piezometer measurements above the bottom of the stream as taken at each successive weir are plotted against the horizontal distance of flow, there is described a practically perfect parabola. In other words, the decrease in static head, when plotted against the distance traveled by the water, described a parabola, which according to the well known laws of hydraulics is the path traveled by water having an initial horizontal velocity and allowed to fall freely.

These results demonstrate the accuracy of the above theoretical explanation of the method of the invention. Moreover, the discharge when determined by the measuring rule over the series of weirs described above, in the same channel, was substantially constant, thus demonstrating the practicability and accuracy of the method and rule.

The rule is applicable not only to sharp-crested weirs, but likewise to any weir wherein the head on the weir is equal to or greater than the breadth of the weir crest. We have also found that the rule is adaptable to a weir having end contraction as well as to weirs without end contraction.

It will be perceived that the use of a channeled bar member having its open side downstream and the mounting of the piezometer tube in the channel thereof effectively isolates the tube from the flow of the surrounding stream and prevents errors in the measured static head due to velocity components of the stream. Another advantage of the present invention is that all measurements to be taken at the weir may be read after the weir rule has been removed from the weir for this purpose. This eliminates to a large extent errors in reading the water heights which are encountered when the rule is read in position on the weir. Furthermore, by the use of the sliding scale attachment, more accurate readings are taken and more accurate results obtained. The rule is furthermore self-contained, comprising a single completely operative unit, and the simplicity and efficiency of its operation will be apparent from the foregoing description.

While only one embodiment of the measuring instrument has been described and illustrated in the drawings, it will now be apparent to those skilled in the art that the invention is capable of embodiments in many other forms, and that changes may be made in the construction, arrangement and details of the parts, without departing from the spirit of the invention.

It will also be apparent that the method described above is not in any way dependent on the particular instrument described, since the practice of said method requires no particular form of rule, nor any particular dimensions thereof, nor calibrations according to the particular relation herein described, etc. Furthermore, any suitable means may be employed for determining the static head at the weir while the practice of the invention is not limited to the use of any paricular piezometer tube, nor to such a tube combined with any particular form of rule, etc.

Reference is therefore to be had to the appended claims to define the limits of the invention.

What is claimed is:

1. Apparatus for measuring quantities of water flowing over a weir comprising a channeled member adapted to be positioned vertically on a weir crest to act as an obstruction to the water flow whereby a surge is created on its upstream face, said member including a vertically adjustable scale element the zero point of which may be positioned either at the crest of the weir or at a height above the crest of the weir equal to the static pressure head at the weir, and means slidable in the channel of said member to indicate the static pressure level, said vertically adjustable element bearing scales calibrated respectively to show the rates of water flow above and the rates below said zero point which rates correspond to the height of said surge when said scale element is positioned with its zero point above the weir crest a distance corresponding to the static head at the weir.

2. Apparatus for measuring quantities of water flowing over a weir comprising a channeled member adapted to be positioned vertically on a weir crest to act as an obstruction to the water flow whereby a surge is created on its upstream face, said member including a vertically adjustable scale element the zero point of which may be positioned either at the crest of the weir or at a height above the crest of the weir equal to the static pressure head at the weir, and means operatively connected with said scale element and slidable therewith and in the channel of said member to indicate the static pressure level, said vertically adjustable member bearing scales calibrated respectively to show the rates of water flow above and the rates below said zero point which rates correspond to the height of said surge when said scale element is positioned with its zero point above the weir crest a distance corresponding to the static head at the weir.

3. Apparatus for measuring quantities of water flowing over a weir comprising a member adapted to be positioned vertically on a weir crest to act as an obstruction to the water flow whereby a surge is created on its upstream face, said member including an adjustable scale element the zero point of which may be positioned either at the crest of the weir or at a height above said crest equal to the static pressure head at the weir, and a tube operatively mounted on said member and communicating with the water whereby it is adapted to receive a hydrostatic column of liquid for indicating the static level, said scale element bearing scales calibrated one to show the rates of water flow above and the other the rates below said zero point which rates correspond to the height of said surge when said scale element is positioned with its zero point above the weir crest a distance corresponding to the static head at the weir.

4. Apparatus for measuring quantities of water flowing over a weir comprising a channeled member adapted to be positioned vertically on a weir crest to act as an obstruction to the water flow whereby surge is created on its upstream face, said member including an adjustable scale element adapted to be so positioned that its zero point is either at the weir crest or at a height above the weir crest equal to the static pressure head at the weir, and a tube positioned in the channel of said member and communicating with the water whereby it is adapted to receive a hydrostatic column to indicate the static pressure level, said adjustable member bearing scales calibrated respectively to show the rates of water flow above and the rates below said zero point which rates correspond to the height of said surge when said element is positioned with its zero point above the weir crest a distance corresponding to the height of the static head at the weir.

5. Apparatus for measuring quantities of water flowing over a weir comprising a member adapted to be positioned vertically on a weir crest to act as an obstruction to the water flow whereby a surge is created on its upstream face, said member including an adjustable scale element the zero point of which may be positioned either at the crest of the weir or at a height above said crest equal to the static pressure head at the weir, and a tube slidable on said member and communicating with the water whereby it is adapted to receive a hydrostatic column of liquid for indicating the static level, said scale element bearing scales calibrated one to show the rates of water flow above and the other the rates below said zero point which rates correspond to the height of said surge when said element is positioned with its zero point above the weir crest a distance corresponding to the static head at the weir.

6. Apparatus for measuring quantities of water flowing over a weir comprising a member adapted to be positioned vertically on a weir crest to act as an obstruction to the water flow whereby a surge is created on its upstream face, said member including an adjustable scale element the zero point of which may be positioned either at the crest of the weir or at a height above said crest equal to the static pressure head at the weir, and a tube slidable on said member and operatively connected with said scale element, said tube communicating with the water whereby it is adapted to receive a hydrostatic column of liquid for indicating the static level, said scale element bearing scales calibrated one to show the rates of water flow above and the other the rates below said zero point which rates correspond to the height of said surge when said element is positioned with its zero point above the weir crest a distance corresponding to the static head of the weir.

7. Apparatus for measuring quantities of water flowing over a weir comprising a channeled member adapted to be positioned vertically on a weir crest with the open side of its channel downstream and to act as an obstruction to the water flow whereby a surge is created on its upstream face, said member including a vertically adjustable scale element the zero point of which may be positioned at a height above the crest of the weir equal to the static pressure head at the weir, and a tube operatively connected with said adjustable scale element and slidable therewith and in the channel of said member, said tube communicating with the water whereby it is adapted to receive a hydrostatic column to indicate the static pressure level, said adjustable scale element bearing scales calibrated respectively to show the rates of water flow above and the rates below said height which rates correspond to the height of said surge when said element is positioned with its zero point above the weir crest a distance corresponding to the static head at the weir.

8. Apparatus for measuring quantities of water flowing over a weir comprising a member adapted to be positioned vertically on a weir crest to act as an obstruction to the water flow whereby a surge is created on its upstream face, said member including a vertically adjustable scale element the zero point of which may be positioned at a height above the crest of the weir equal to the static pressure head at the weir, a tube communicating with the water and adapted to receive a hydrostatic column to indicate the static pressure level, and valve means for closing said tube to prevent the escape of water therefrom, said adjustable element bearing scales calibrated respectively to show the rates of water flow above and the rates below said height which rates correspond to the height of said surge when said element is positioned with its zero point above the weir crest a distance corresponding to the static head at the weir.

9. Apparatus for measuring quantities of water flowing over a weir comprising a channeled member adapted to be positioned vertically on a weir crest with the open side of its channel downstream and to act as an obstruction to the water flow whereby a surge is created on its upstream face, said member including a vertically adjustable scale element the zero point of which may be positioned at a height above the crest of the weir equal to the static pressure head at the weir, a tube positioned in the channel of said member and communicating with the water whereby it is adapted to receive a hydrostatic column to indicate the static pressure level, and valve means for closing said tube to prevent the escape of water therefrom, said adjustable element bearing scales calibrated respectively to show the rates of water flow above and the rates below said height which rates correspond to the height of said surge when said element is positioned with its zero point above the weir crest a distance corresponding to the static head at the weir.

10. Apparatus of the class described comprising a member adapted to be positioned vertically on a weir crest to act as an obstruction to the water flow whereby a surge is created on its upstream face, said member including a vertically adjustable scale element the zero point of which may be positioned either on the crest of the weir or at a height above said crest equal to the static pressure head at the weir, a tube slidably mounted relative to said member and communicating with the water whereby it is adapted to receive a hydrostatic column to indicate the static pressure level, and an index slidable relative to said tube to indicate the water height therein, said scale element bearing scales calibrated respectively to show the rates of water flow above and the rates below said height which rates correspond to the height of said surge when said element is positioned with its zero point above the weir crest a distance corresponding to the static head at the weir.

11. Apparatus of the class described comprising a member adapted to be positioned vertically on a weir crest whereby a surge of water is created on its upstream face, said member including a vertically adjustable scale element the zero point of which may be positioned either at the crest of the weir or at a height above the crest equal to the static pressure head at the weir, a tube slidably mounted relative to said member and communicating with the water whereby it is adapted to receive a hydrostatic column to indicate the static pressure level, and a sliding scale to read the height of water in said tube, said scale element bearing scales calibrated respectively to show the rates of water flow above and the rates below said height, which rates correspond to the height of said surge when said element is positioned with its zero point above the weir crest a distance corresponding to the static head at the weir.

12. Apparatus of the class described comprising a channeled member adapted to be positioned vertically on a weir crest whereby a surge of water is created on its upstream face, said member including a vertically adjustable scale element the zero point of which may be positioned at a height above the crest of the weir equal to the static pressure head at the weir, a tube slidably positioned in the channel of said member and communicating with the water whereby it is adapted to receive a hydrostatic column to indicate the static pressure level, valve means for closing said tube to prevent escape of water therefrom, and a sliding scale to read the height of water in said tube, said scale element bearing scales calibrated respectively to show the rates of water flow above and the rates below said height which rates correspond to the height of said surge when said element is positioned with its zero point above the weir crest a distance corresponding to the static head at the weir.

13. A weir discharge rule comprising an elongated channeled member, a scale member longitudinally displaceable relative thereto, a tube slidable in the channel of said first named member and operatively connected with said scale member, a valve for the lower end of said tube, and a valve operating rod extending out of the other end of said tube.

14. A weir discharge rule comprising an elongated channeled member having a scale thereon, a scale member longitudinally displaceable relative thereto; a tube slidable in the channel of said first named member, a valve for the lower end of the tube, and a sliding scale cooperating with said first-named scale.

15. A weir discharge rule comprising an elongated member, a scale member displaceable longitudinally relative thereto, a tube operatively connected with said scale member and slidable therewith relative to said first member, said tube being open at both ends, valve means for closing the lower end of said tube, and a slidable scale adjacent said tube, said first-named member having a scale with which said slidable scale cooperates to indicate the height of water in said tube.

16. A method of obtaining accurately measured quantities of water over a weir which consists in causing water to flow over a weir, measuring the combined static head on the weir and the head due to velocity of approach by interposing an obstruction at the weir presenting a vertical surface normal to the water flow and measuring the height of the surge thereon above the crest of the weir, measuring the static head at the weir to determine the fall in static head across the weir, and determining the flow of water over the weir from the surge height and static head at the weir.

17. A method of obtaining measured quantities of water over a weir which consists in causing water to flow over a weir, measuring the upstream static head above the crest of the weir by interposing at the weir an obstruction presenting a vertical surface normal to the water flow and measuring the height of the surge thereon above the crest of the weir, measuring the static head at the weir by measuring the height above the crest of the weir of a hydrostatic column subjected to the static pressure of the water flowing over the weir, determining the fall in static head across the weir by the difference between the heights of said surge and of said hydrostatic column, and determining the amount of water flowing over the weir from the static head at the weir and the fall in static head across the weir.

18. In a method of obtaining measured quantities of water, the steps of causing the water to flow over a weir, measuring the combined head on the weir and the head due to velocity of approach by interposing at the weir an obstruction presenting a vertical surface normal to the flowing water to produce a surge on the upstream face of the obstruction, and measuring the height of said surge above the crest of the weir to determine the rate of flow of the water over the weir which corresponds to the height of the surge above the crest of the weir.

In testimony whereof we have signed this specification.

INGARD M. CLAUSEN.
RALPH A. PIERCE.